United States Patent [19]

Odagawa et al.

[11] Patent Number: 4,866,379
[45] Date of Patent: * Sep. 12, 1989

[54] TILT SENSOR HAVING CENTRAL FIRST BOTTOM SURFACE AND SECOND CONTIGUOUS BOTTOM SURFACE AT AN ANGLE THERETO

[75] Inventors: Yoshimoto Odagawa; Yasushi Yanagisawa; Hiraku Imaizumi; Teruo Mori; Takashi Shioura; Kazuhiro Okada; Kiyoshi Yanagisawa, all of Chiba, Japan

[73] Assignee: TDK Corporation, Tokyo, Japan

[*] Notice: The portion of the term of this patent subsequent to Feb. 7, 2006 has been disclaimed.

[21] Appl. No.: 112,626

[22] Filed: Oct. 22, 1987

[30] Foreign Application Priority Data

| Oct. 25, 1986 | [JP] | Japan | 61-164055[U] |
| Mar. 7, 1987 | [JP] | Japan | 62-51209 |
| Mar. 7, 1987 | [JP] | Japan | 62-32581[U] |
| Mar. 10, 1987 | [JP] | Japan | 62-33908[U] |

[51] Int. Cl.$^4$ .............................................. G01B 7/14
[52] U.S. Cl. .................................. 324/207; 324/262; 33/364
[58] Field of Search ............... 324/207, 208, 226, 227, 324/236, 228, 234–235, 239–243, 244, 259, 260, 261, 262, 345, 346; 33/364

[56] References Cited

U.S. PATENT DOCUMENTS

| 3,252,057 | 5/1966 | Hoeppel | 324/208 X |
| 3,305,805 | 2/1967 | Tann | 324/228 X |
| 3,397,347 | 8/1968 | Hoeppel | 324/208 X |
| 4,282,484 | 8/1981 | Morrow | 324/226 X |
| 4,316,145 | 2/1982 | Tann | 324/208 |
| 4,442,405 | 4/1984 | Andrejasich et al. | 324/207 X |
| 4,694,247 | 9/1987 | Meilli et al. | 324/262 X |

FOREIGN PATENT DOCUMENTS

| 0108401 | 6/1983 | Japan | 324/208 |
| 610020 | 5/1978 | U.S.S.R. | 324/208 |
| 896380 | 1/1982 | U.S.S.R. | 324/208 |

Primary Examiner—Reinhard J. Eisenzopf
Assistant Examiner—Warren S. Edmonds
Attorney, Agent, or Firm—Burgess, Ryan & Wayne

[57] ABSTRACT

There is proposed a tilt sensor in which a permanent magnet having a surface coated with a magnetic field is housed in a hollow portion of a nonmagnetic case, and a magnetic sensing element is disposed outside a bottom portion of the case. When the case is tilted at an angle exceeding a predetermined angle, the permanent magnet is greatly moved and the magnetic sensing element detects the movement of the magnet. Furthermore, adverse influences due to magnetic attraction between the permanent magnet and the magnetic sensing element or a surface tension of the magnetic fluid are compensated.

17 Claims, 12 Drawing Sheets

TILT SENSOR HAVING CENTRAL FIRST BOTTOM SURFACE AND SECOND CONTIGUOUS BOTTOM SURFACE AT AN ANGLE THERETO

BACKGROUND OF THE INVENTION

I. Field of the Invention

The present invention relates to a tilt sensor for detecting a tilt of an object when the object is tilted.

II. Description of the Prior Art

Conventional tilt measuring devices of this type vary from simple devices such as a level and a device used in an oilstove to visually show horizontality by suspending a counterweight through a chain to a sophisticated one such as a gyroscopic horizon.

Although a simple device such as a level is inexpensive, a tilt can be checked by only a visual observation. Therefore, it is not designed to be used in a control system for resetting a tilted object to a horizontal position. Use of a sophisticated device such as a gyroscopic horizon is limited to an expensive machine such as an aircraft.

Therefore, the present inventors proposed a tilt sensor wherein a permanent magnet a surface of which is coated with a magnetic fluid is arranged inside a hollow portion of a case, and a magnetic sensing element is disposed outside the case, so that when the case is tilted, the permanent magnet disposed therein is moved to the lowest position by its weight, and hence magnetism detected by the magnetic sensing element changes, thereby detecting that the case is tilted (Japanese Patent Application No. 61-169930, U.S. Application No. 074,249, and EPC Application No. 87110176.2).

According to the above invention, a tilt can be detected with high precision by a simple arrangement, and its detection signal can be applied to a control system for attitude control or the like.

SUMMARY OF THE SUMMARY

The present invention is based on an application and improvement of the basic arrangement of the previously proposed tilt sensor.

It is a first object of the present invention to provide a tilt sensor wherein unlike the proposed tilt sensor in which as a case is tilted, a permanent magnet is continuously and gradually, i.e., linearly moved so that an intensity of magnetism around the magnetic sensing element continuously and gradually changes, when a tilt of a case is below a predetermined angle, magnetism detected by a magnetic sensing element scarcely changes, and when it exceeds the predetermined angle, a permanent magnet inside the case is greatly moved so that magnetism detected by the magnetic sensing element abruptly, i.e., nonlinearly changes, thereby accurately detecting that the tilt of the case exceeds the predetermined angle.

In order to achieve the above object, a bottom portion of a tilt sensor of the present invention is designed such that a first bottom surface located at the central position of the case, and a second bottom surface formed around the first bottom surface cross each other to define a predetermined angle. As a result, it is only when a tilt exceeds the predetermined angle that the permanent magnet is greatly displaced.

When the case is tilted and the permanent magnet is moved, the gravity is not the only factor which acts on the magnet, but there are other factors, e.g., a magnetic attraction between a magnet and leads of a reed switch when the reed switch is used as a magnetic sensing element, and the viscosity and surface tension of the magnetic fluid. Especially, the magnetic attraction changes as mounting precision of components of the sensor varies. Therefore, a reliable operation of the reed switch at a predetermined angle cannot be guaranteed.

It is a second object to provide a tilt sensor wherein a permanent magnet can be adjusted to be reliably moved at a predetermined tilt angle so that a magnetic sensing element can be reliably operated.

In order to achieve the above object, as a first means, a magnetic body which applies magnetic influences on the permanent magnet is arranged on a ceiling portion of a nonmagnetic case such that the magnetic influences can be controlled. As a second means, the magnetic sensing element is arranged in the case to be freely displaced from the center of a bottom portion thereof in the radial direction.

It is a third object to solve a problem, i.e., that the magnetic sensing element responds at different angles when the case is tilted and when the case is returned to a horizontal position, due to surface tension of the magnetic fluid. In order to achieve the above object, the case is arranged such that the bottom surface is continuous with its side wall at a relatively large radius R of curvature.

The above and other objects, features, and advantages of the present invention will be apparent from the following detailed description of embodiments in conjunction with the accompanying drawings.

Figure 1:
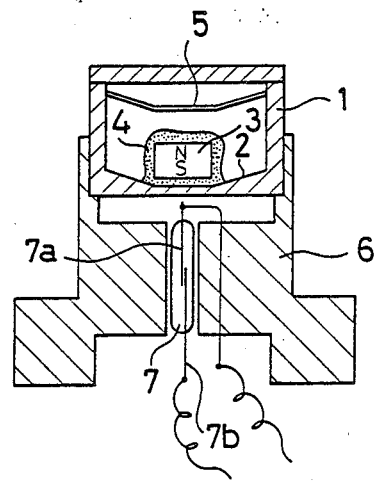
FIG. 1 is a sectional view of a first embodiment of the present invention.
Figure 2A:
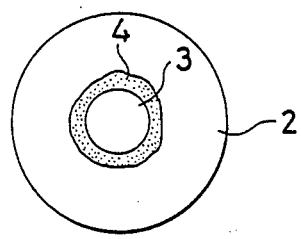
FIG. 2(a) and 2(b), FIG. 3, and FIGS. 4(a), 4(b), and 4(c) are views illustrating an operation of the embodiment.
Figure 2B:
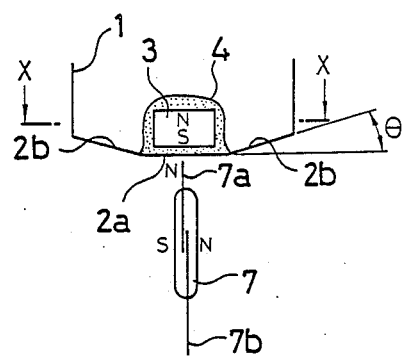

DETAILED DESCRIPTION OF THE PREFERRED EMBODIMENTS:

FIG. 1 shows a first embodiment of the present invention. Reference numeral 1 denotes a nonmagnetic case made of a material such as aluminum. As shown in FIG. 2, a hollow portion of the case 1 includes a bottom portion 2 which is constituted by a round flat surface 2a as a first bottom surface located at the central position of the hollow portion, and an inverted frustoconical surface 2b as a second bottom surface formed around the flat surface 2a to have a predetermined sharp angle $\theta$ with respect thereto. FIG. 2(a) is a sectional view taken along the line X—X in FIG. 2(b). Reference numeral 3 denotes a permanent magnet a surface of which is coated with a magnetic fluid 4. The magnetic fluid 4 is prepared by dispersing magnetic metal powder (e.g., cobalt, iron, nickel, or the like) particles having a diameter of 50 Å to 150 Å in a liquid (e.g., kerosine or water) having a relatively low viscosity. In general, a surface-active agent is added. Reference numeral 5 denotes a cover located at a predetermined height above the bottom portion 2 so that the permanent magnet 3 is not turned upside down; 6, a mounting base; and 7, a reed switch serving as a nonlinear magnetic sensing element arranged outside the bottom portion of the case 1. One end of one reed 7a is located near the central portion of the bottom portion 2 and one end of the other reed 7b is located apart from the bottom portion.

An operation of the embodiment will be described below. FIG. 2 shows a state wherein the case 1 is not tilted and the flat surface 2a located at the central portion of the bottom portion is horizontal. In this case, since the permanent magnet 3 is positioned on the flat surface 2a, the end portion of one reed 7a of the reed switch is positioned near the permanent magnet 3. As a result, one end portion of the reed 7a is influenced by magnetism of the permanent magnet 3 and is magnetized with the N pole, and the other end (a central portion of the reed switch) of the reed 7a becomes the S pole. In addition, since one end portion of the other reed 7b located near the S pole of the reed 7a is magnetized with the N pole, both the reeds attract each other and are electrically connected to each other. In this case, if a circuit is connected to the reeds 7a and 7b, the circuit is closed.

Figure 3:
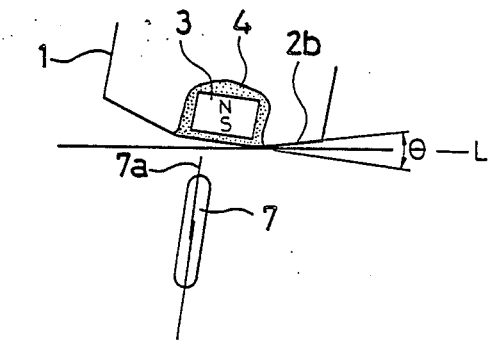

Assume that the case is tilted, as shown in FIG. 3. When a tilt is small, since the frustoconical surface 2b is still defining an upwardly inclined surface at a certain angle with respect to a horizontal surface L, the permanent magnet 3 is positioned near the flat surface of the central portion, and hence the reed 7a of the reed switch 7 is influenced by the magnetism of the permanent magnet, thereby keeping the both reeds connected to each other.

Figure 4A:
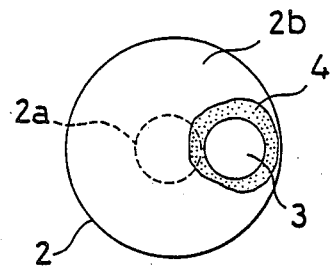
Figure 4C:
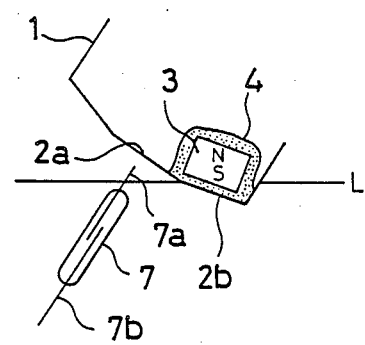
Figure 4B:
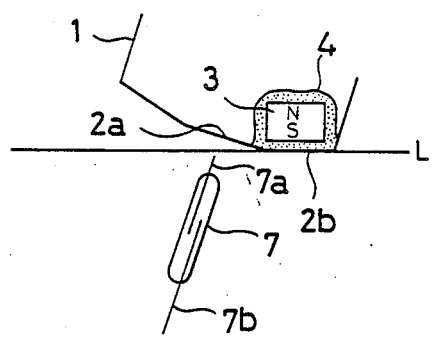

As shown in FIGS. 4(a) and 4(b), when the case 1 is further tilted at an angle $\theta$ (in practice, a tilt angle is larger than $\theta$ due to viscosity of the magnetic fluid, as shown in FIG. 4(c)) defined by the flat surface 2a of the substantially central portion and the frustoconical surface 2b, the permanent magnet 3 is quickly and completely moved from the flat surface 2a of the central porion to the frustoconical surface 2b by its weight. That is, a position of the permanent magnet with respect to the flat surface 2a of the central portion is changed in a nonlinear manner. When the permanent magnet is moved, the magnetic fluid 4 serves as a lubricant so that the permanent magnet can be moved with a very small resistance, and hence it can be easily moved to the lowest position of the bottom portion. In this case, the end portion of the reed 7a of the reed switch 7 is quickly, i.e., nonlinearly positioned out of substantially the range of magnetic influences, so that the reed 7a is substantially demagnetized. As a result, a magnetic attraction between the reeds 7a and 7b substantially disappears to open the switch.

As is apparent from the above description, in the embodiment, when the case is tilted at an angle exceeding a predetermined angle, the reed switch is quickly, i.e, nonlinearly opened, thereby accurately detecting that the case is tilted at an angle exceeding the predetermined angle. If the case is returned to the horizontal position, the permanent magnet is also quickly returned to the flat surface of the central portion, thereby quickly, i.e., nonlinearly closing the reed switch.

Although the first bottom surface is a flat surface and the second bottom surface is a frustoconical surface in this embodiment, the surfaces may be slightly concave. What is essential is that the first and second bottom surfaces cross each other at an angle in a nonlinear manner.

Figure 5:
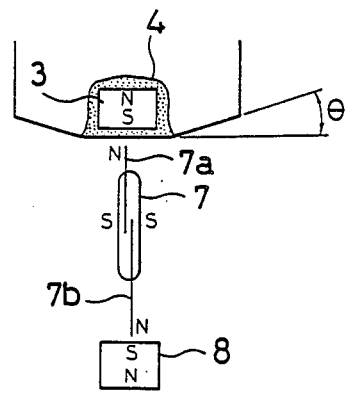
FIG. 5 is a view showing an arrangement of a second embodiment of the present invention.

FIG. 5 shows an embodiment (a second embodiment) similar to that of FIG. 1. In the embodiment in FIG. 1, when the case 1 is in the state shown in FIG. 2, the reed switch 7 is closed. In the embodiment in FIG. 5, however, the switch is kept open by arranging an auxiliary magnet 8 near one end portion of the other reed 7b of the reed switch. More specifically, if the polarities of the two magnets and disposition of the reed switch are arranged as shown in FIG. 5, the ends of both reeds have the same polarity at the central portion of the reed switch 7, and hence they repel each other and are not connected to each other. When the case is tilted and one end portion of the reed 7a is not substantially subjected to magnetic influences of the permanent magnet 3, the reed 7a is influenced only by the auxiliary magnet 8, so that the ends of the both reeds have the different polarities and are connected to each other.

Figure 6:
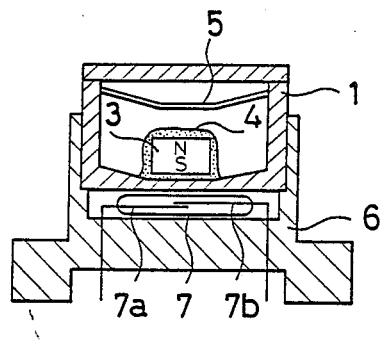
FIG. 6 is a sectional view of a third embodiment.
Figure 7A:
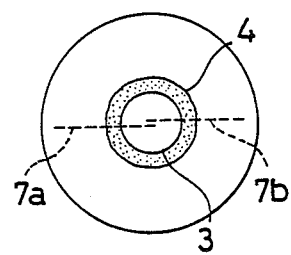
FIGS. 7(a) and 7(b), and FIGS. 8 (a) and 8(b) are views illustrating an operation of the third embodiment.
Figure 7B:
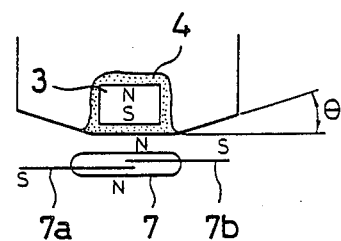

FIG. 6 shows a third embodiment of the present invention, wherein the reed switch is laid on its side to be substantially parallel to the first bottom surface of the case 1. In this case, when the case is not tilted, as shown in FIGS. 7(a) and 7(b), both reeds 7a and 7b of the reed switch 7 receive the same influences from the permanent magnet 3. Since the both reeds have the same polarity at the central portion of the switch, they repel each other. Therefore, the switch is opened.

Figure 8A:
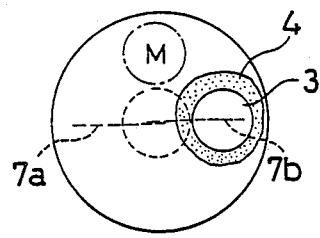
Figure 8B:
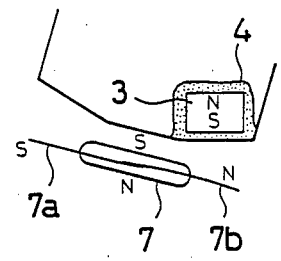

When the case is tilted and the permanent magnet 3 is moved to a position shown in FIG. 8, i.e., the second surface is positioned slightly below the horizontal plane, only one reed 7b is influenced by the permanent magnet 3. As a result, the both reeds have the different polarities at the central portion of the switch and are connected to each other. When the case 1 is tilted such that the permanent magnet is moved in a direction M, the both reeds are not subjected to the influences of the permanent magnet, or are equally subjected to them, and hence the switch is not closed. Therefore, in this embodiment, directivity of a tilt can also be detected.

In this embodiment, the relationship between a tilt angle of the case and movement of the permanent magnet can be defined in the same manner as in the first embodiment.

In order to optimize the magnetic influences of the permanent magnet with respect to the reed switch, it is preferable that a mounting position of the reed switch can be adjusted. Furthermore, the permanent magnet may have a ring-like shape. Furthermore, the permanent magnet may have any shape as long as it is not turned upside down in relation with the cover 5. Although the reed switch is used as a magnetic sensing element in these embodiments, other elements, e.g., a Hall element, may be used. In addition, an oxide magnetic fluid prepared by dispersing a ferrite magnetic powder in a liquid as well as the magnetic metal fluid can be used as the magnetic fluid to obtain the same effect.

As has been described above, according to the present invention:

(1) since the first and second bottom surfaces nonlinearly cross each other, when the case is tilted, and the tilt angle exceeds a predetermined angle, the switch is opened/closed in a nonlinear manner, so that whether the case, i.e, the tilt sensor is tilted at a predetermined angle or not can be accurately detected, while an erroneous operation of the tilt sensor due to small vibrations or the like can be prevented, (2) since the reed switches in the first and second embodiments are vertically mounted, they are especially suitable to a case wherein a size in a lateral direction is required to be small, (3) since the auxiliary magnet is provided in the second embodiment, the magnetism around the reed switch is enhanced so that the operation of the reed switch is stabilized, and the erroneous operation of the reed switch by small vibrations can be prevented, (4) since the reed switch is laterally arranged in the third embodiment, it is especially suitable to a case wherein a size in a vertical direction is required to be small, and directivity of a tilt can also be detected, and (5) since each of the reed switches used in the first, second, and third embodiments has a simple structure, and hence can be manufactured at low cost, and moreover, a nonlinear open/close operation can be easily performed.

However, it is found that when the case tilted and permanent magnet is moved, the gravity is not the only factor which acts on the magnet, but there are other factors, such as the viscosity and surface tension of the magnetic fluid, and magnetic attraction between the magnet and the reeds of the reed switch. Especially, the magnetic attraction has a great influence. If mounting precision of the components of the sensor varies, i.e., a variation in interval between the magnet and the reed switch is caused, such variation directly reflects a variation in magnetic attraction. For this reason, a reliable operation of the reed switch at a predetermined tilt angle cannot be guaranteed.

Therefore, a tilt sensor which is capable of solving the above problems, and can be adjusted so that a magnet can be reliably moved at a predetermined tilt angle will be described below.

Figure 9A:
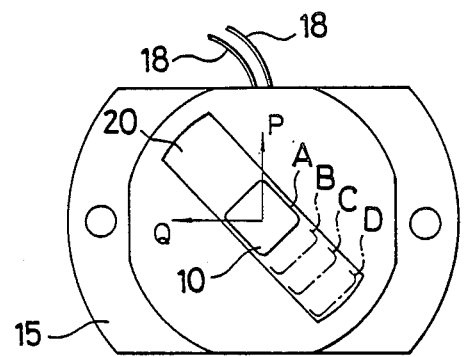
FIG. 9(a) is a plan view of a fourth embodiment of the present invention.
Figure 9B:
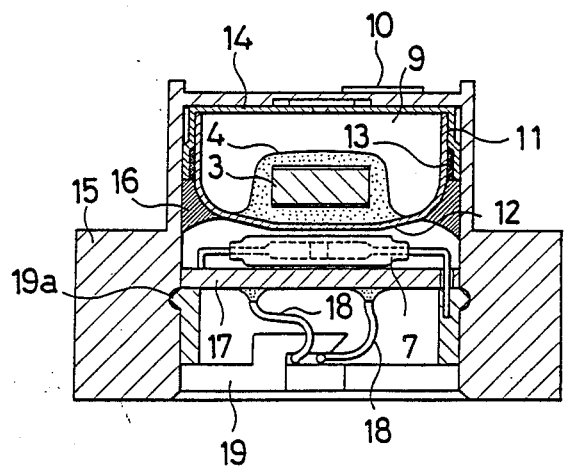
FIG. 9(b) is a sectional view thereof.
Figure 10:
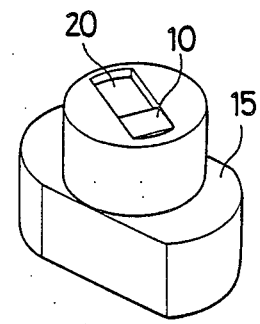
FIG. 10 is an exploded perspective view thereof.
Figure 10:
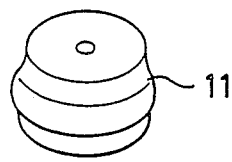
Figure 10:
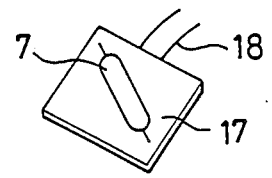
Figure 10:
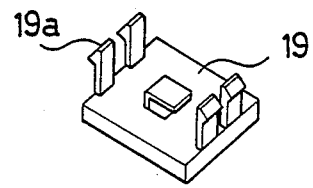

FIG. 9 shows a fourth embodiment of the present invention, and FIG. 10 is an exploded perspective view thereof. Reference numeral 11 denotes a nonmagnetic case which is constituted by a bottom portion 12 consisting of a first bottom surface located at the central portion of the case and a second bottom surface continuous with and crossing the first bottom surface at a predetermined angle, side wall 13 continuous with the bottom portion 12, and lid 14, and includes a sealed hollow portion 9. The hollow portion 9 contains a substantially disk-like permanent magnet 3 a surface of which is coated with a magnetic fluid 4. Reference numeral 15 denotes a sensor mounting base. The case 11 is inserted into an upper portion of the sensor mounting base and fixed by a resin 16. Reference numeral 7 denotes a reed switch serving as a magnetic sensing element disposed on a printed board 17, reed terminals of the reed switch being soldered. Leads 18 extend from the printed board. Reference numeral 19 denotes a lower cover fixed by fitting pawls 19a extending from opposite sides in recesses formed in the mounting base 15. Reference numeral 20 denotes a groove formed in the upper surface of the mounting base 15. For example, an amorphous magnetic body 10 having a large saturation magnetization ($\sigma_s$) is, e.g., adhered and fixed to a specific portion of the groove.

As is apparent from FIG. 10, the reed switch 7 is mounted on the printed board along a diagonal line thereof. The groove 20 formed on the upper surface of the mounting base 15 is arranged in the same direction as that of the reed switch 7. This arrangement is made so that a single reed switch can detect tilts in directions indicated by arrows P and Q shown in FIG. 9(a).

This embodiment can be characterized in that a magnetic body is arranged on a ceiling portion of the case. An operation of the embodiment will be described in comparison with a case wherein the magnetic body is not arranged on the ceiling portion of the case.

Figure 11A:
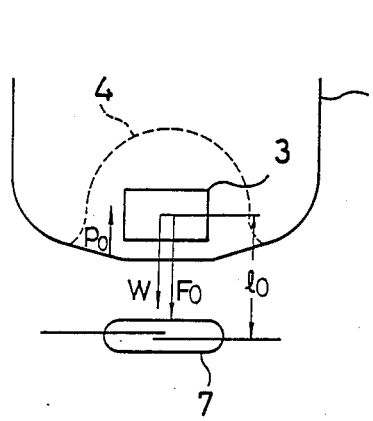
FIGS. 11(a) and 11(b) are views showing an operation when a magnetic body is not disposed on a ceiling portion.
Figure 11B:
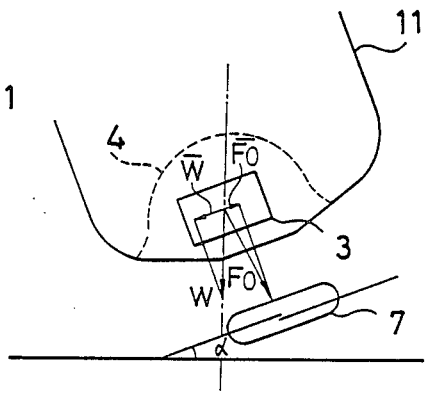

FIGS. 11(a) and 11(b) show a case wherein the magnetic body is not arranged on the ceiling portion of the case. In FIG. 11(a), gravity W vertically acts on the permanent magnet 3 while a magnetic attraction $F_0$ acts between the permanent magnet 3 and the reeds of the reed switch 7. The magnetic fluid 4 covering the permanent magnet 3 flows between the permanent magnet and the bottom surface of the case, and tends to float the permanent magnet. That is, an upward force $P_0$ acts on the permanent magnet 3. The force is balanced as follows:

$$P_0 = W + F_0$$

wherein a distance between the permanent magnet and the lead switch is represent by $L_0$.

As shown in FIG. 11(b), as the case 11 is tilted, a component of force $\overline{W}$ of the gravity W is generated. The component of force $\overline{W}$ is a force to move the permanent magnet 3 to a lower position of the bottom portion of the case 11. In addition, a component of force $\overline{F}_0$ of the magnetic attraction $F_0$ is generated. The component of force $\overline{F}_0$ acts in a direction opposite to that of the component of force W. Therefore, the component of force $\overline{F}_0$ is a force to stop the movement of the permanent magnet. Note that the vector of force shown here only indicates a qualitative relationship. Furthermore, in this case, the viscosity and surface tension of the magnetic fluid are neglected.

Figure 12A:
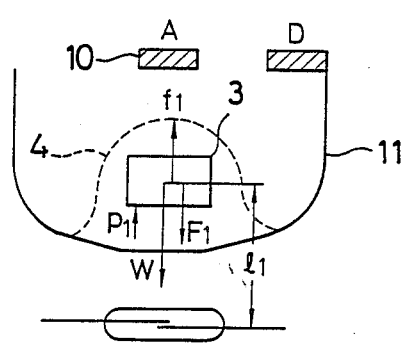
FIGS. 12(a) and 12(b) are views showing an operation when a magnetic body is disposed on the ceiling portion of the fourth embodiment.
Figure 12B:
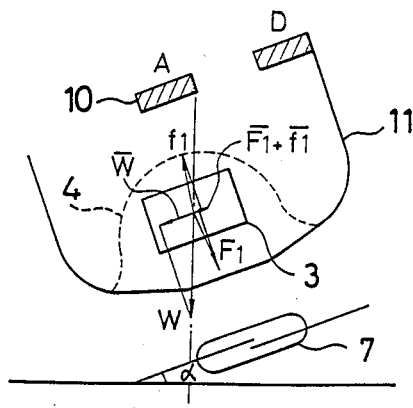

FIGS. 12(a) and 12(b) show an arrangement according to the fourth embodiment of the present invention, wherein the magnetic body 10 is disposed on a central portion A of the ceiling portion. In this case, as shown in FIG. 12(a), a magnetic attraction $f_1$ generated by the magnetic body 10 acts on the permanent magnet 3 other than the gravity W, the magnetic attraction $F_1$, and the upward force $P_1$ generated by the magnetic fluid 4. They are balanced as follows:

$$P_1 + f_1 = W + F_1$$

wherein a distance between the permanent magnet and the 1 reed switch is represented by $l_1$.

In this case, since the magnetic attraction $f_1$ is present between the permanent magnet 3 and the magnetic body 10, the permanent magnet 3 is attracted toward the magnetic body 10 compared with the case shown in FIGS. 11(a) and 11(b). More specifically, the distance $l_1$ between the permanent magnet 3 and the reed switch 7 is represented by $l_1 > l_0$. As a result, the magnetic attraction $F_1$ acting between the permanent magnet 3 and the reed switch 7 is represented by $F_1 < F_0$.

When the case 11 is tilted, as shown in FIG. 12(b), the component of force $\overline{W}$ of the gravity W, the component of force $\overline{F}_1$ of the magnetic attraction $F_1$, and a component of force $\overline{f}_1$ of the magnetic attraction f are generated. The both components of force $\overline{F}_1$ and $\overline{f}_1$ act in a direction opposite to that of the component of force $\overline{W}$ of the gravity. When the component of force $\overline{F}_1$ and $\overline{f}_1$ are compared with the component of force $\overline{F}_0$ in FIG. 11(b), $\overline{F}_1 + \overline{f}_1 < \overline{F}_0$. In conclusion, the arrangement wherein the magnetic body 10 is disposed on the central portion A of the ceiling portion of the case allows easy movement of the permanent magnet 3, and hence the reed switch 7 is operated at a small tilt angle $\alpha$.

However, when the magnetic body 10 is located at a position D of the ceiling portion, a magnetic attraction $f_2$ (not shown) is small because the distance between the permanent magnet and the magnetic body is large. Therefore, the permanent magnet floats above the bottom surface of the case at a small height. For this reason, the magnetic attraction $F_2$ (not shown) between the permanent magnet and the reed switch is not considerably different from the magnetic attraction $F_0$ in FIG. 11. On the other hand, as is apparent from the direction of the magnetic attraction $f_2$, a component of force $\overline{f}_2$ (not shown) is large. As a result, $\overline{F}_2 + \overline{f}_2 > \overline{F}_0$. In conclusion, when the magnetic body 10 is arranged at the position D of the ceiling portion of the case, the permanent magnetic 3 is not easily moved, and hence the switch 7 is operated at a large tilt angle $\alpha$.

Thus, tilt angles of the case at which the reed switch is operated, i.e., response angles can be adjusted by the positions (the positions A, B, C, and D in FIG. 9(a)) of the magnetic body located on the ceiling portion. Furthermore, the response angles are influenced by an intensity of the saturation magnetization ($\alpha_s$) of the magnetic body 10 and a distance between the permanent magnet and the magnetic body 10.

Figure 13:
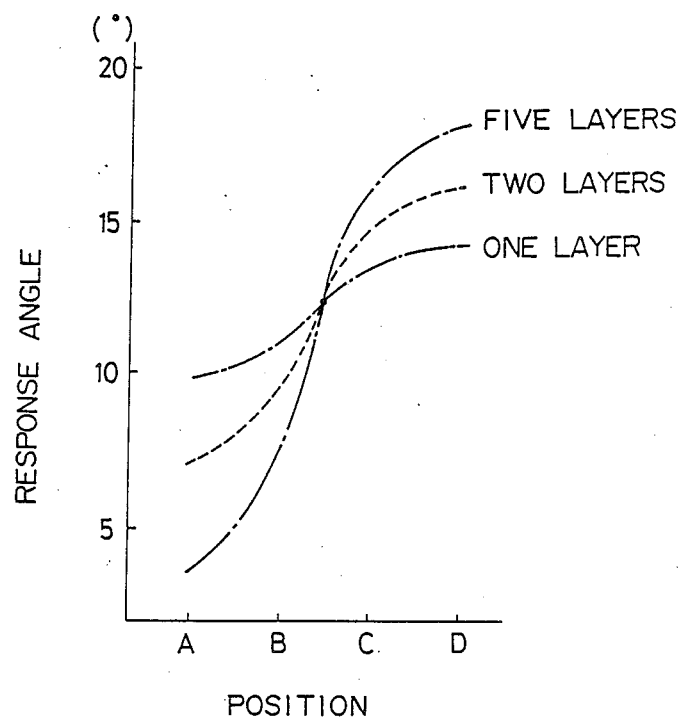
FIG. 13 is a view showing a relationship between mounting positions of the magnetic body of the fourth embodiment and response angles.

FIG. 13 is a graph wherein response angles are obtained when an amorphous magnetic body of 6 mm$^2$ is moved to the positions A, B, C, and D, respectively. When the magnetic body was not used, the response angle was 12.2°. As is apparent from the above graph, as the magnetic body is moved closer to the position A, the response angle becomes smaller. On the contrary, when the magnetic body is moved closer to the position D, the response angle becomes larger. In addition, it is found that the response angles are greatly changed by stacking a plurality of the magnetic bodies to change the mass.

The response angles can be arbitrarily changed in the above-described manner. Therefore, even if variations in, e.g., mounting positions of the components of the sensor are present, the reed switch can be operated at a predetermined tilt angle.

Although in the above embodiment, an amorphous magnetic thin piece is adhered to be used as the magnetic body, the magnetic body is not limited to this, but can be any material such as silica steel as long as it has large saturation magnetization. In addition, a trimmer may be arranged on the central portion of the ceiling portion other than the magnetic thin piece and a distance between a magnetic piece of the trimmer and the permanent magnet may be adjusted. When the magnetic piece is lowered to shorten the distance between the magnetic piece and the permanent magnet, the permanent magnet is displaced upward, and hence the distance between the permanent magnet and the reed switch becomes long, so that the magnetic attraction acting therebetween becomes small. As a result, the permanent magnet can be easily moved at a small tilt angle, thereby reducing the response angle. On the contrary, it is apparent that when the magnetic piece is moved apart from the permanent magnet, the response angles become large.

In the fourth embodiment, a required response angle is obtained by adjusting the position of the magnetic body located on the ceiling portion. In place of the magnetic body, a magnetic sensing element may be arranged. In this case, the magnetic sensing element is displaced from the center of the bottom portion in the radial direction thereof to adjust the response angle. A fifth embodiment of the present invention will be described below, wherein the magnetic sensing element is displaced.

Figure 14:
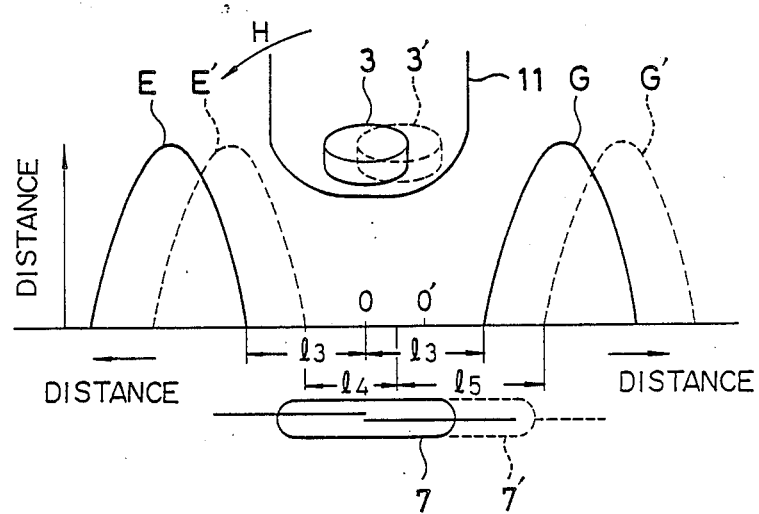
FIG. 14 is a view showing an operation of a fifth embodiment.

FIG. 14 is a view for qualitatively explaining an operation of the fifth embodiment. A permanent magnet 3 and a reed switch are indicated by solid lines. Assume that when the permanent magnet 3 is moved left by a distance $l_3$, the reed switch 7 is operated. Similarly, when the permanent magnet 3 is moved right by the distance $l_3$, the reed switch 7 is operated. Reference symbols E and G denote curves indicating the operation characteristics (to be referred to as operation curves hereinafter), wherein the abscissa represents a movement distance of the permanent magnet 3 from the center O of the reed switch, and the ordinate represents a distance between the permanent magnet and the reed switch. As they move apart from each other in the ordinate direction, magnetic influences acting on the reed switch become small, and hence the movement distance of the permanent magnet in the abscissa direction need be set to be long to operate the reed switch.

When the reed switch is moved to a position 7' indicated by a broken line, the center of the reed switch is moved from the center O to a center O', and the operation curves move to curves E' and G'. Since the magnetic attraction acts between the permanent magnet and the reed switch, the permanent magnet is moved to a position 3' along with movement of the reed switch. However, the permanent magnet is stopped by an arcuated portion of the bottom portion of the case 11, and hence it cannot be further moved toward the center O'. When the case 11 is tilted in a direction H and the permanent magnet 3' is moved left by a distance $l_4$, the reed switch is operated.

More specifically, prior to the displacement of the reed switch, the reed switch is operated when the permanent magnet is moved to the distance $l_3$. For this movement of the permanent magnet, the case need be tilted at, e.g., an angle of 15°. After the displacement of the reed switch, the reed switch is operated when the permanent magnet is moved by the distance $l_4$. In this case, $l_3 > l_4$, and the case need be tilted at, e.g., an angle of 10° to move the permanent magnet by the distance $l_4$.

Note that if the case is tilted in the opposite direction, the permanent magnet need be moved by a distance $l_5$ (>$l_3$) For this purpose, the case must be tilted at an angle of more than 15°.

Thus, a tilt angle of the case, i.e., a response angle can be adjusted by displacing the reed switch to be substantially parallel to the bottom surface of the case at an appropriate position.

Figure 15:
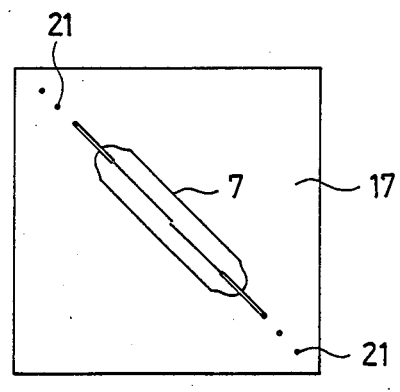
FIG. 15 is a view showing a method of adjusting a mounting position of a reed switch according to the fifth embodiment.

FIG. 15 shows a method of adjusting a position of the reed switch in detail. A plurality of reed switch mounting holes 21 are formed in a printed board 17. A position of the reed switch with respect to the bottom portion of the case is changed by selectively mounting the reed switch 7 in the mounting holes 21, thereby adjusting a response angle. When fine adjustment is required, a length of each of the reeds, i.e., from an end portion of the reed switch to the mounting hole can be appropriately adjusted during soldering. The reed switch 7 is mounted along a diagonal line of the printed board 17 so that the tilts in the directions P and Q shown in FIG. 9(a) can be detected by a single reed switch.

Since a response angle can be arbitrarily set by changing a mounting position of the reed switch, even if variations in, e.g., mounting positions of the components of the sensor are present, the reed switch can be reliably operated at a predetermined tilt angle.

Although the reed switch is mounted by selecting the mounting holes formed in the printed board so as to change the position of the reed switch in the above embodiment, a mechanism for externally moving the printed board on which the reed switch is mounted beforehand may be arranged. In addition, although the reed switch is displaced from the center of the case in the radial direction thereof in the embodiment, the displacement in a vertical direction may be combined with the above displacement.

Figure 16A:
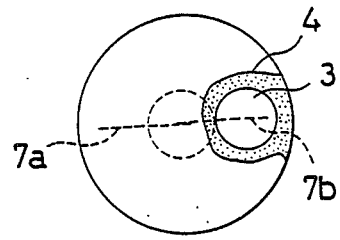
FIGS. 16(a) and 16(b) are views showing influences of surface tension of a magnetic fluid.
Figure 16B:
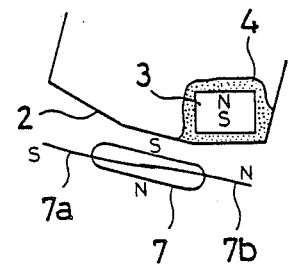

When the permanent magnet is moved, the permanent magnet is influenced by the viscosity and surface tension of the magnetic fluid in addition to the gravity and magnetic attraction between the magnet and reeds of the reed switch. For example, as shown in FIGS. 16(a) and 16(b), when the case is tilted and the permanent magnet 3 is moved, a relatively large area of the side wall of the case is wet with the magnetic fluid 4 due to the surface tension thereof. As a result, when the case is returned to a normal state from a state wherein it is titled, the movement of the permanent magnet is restricted by the wet state of the side wall. More specifically, the tilt angles of the case are different when the permanent magnet is moved from the first bottom surface to the second bottom surface and when it is moved from the second bottom surface to the first bottom surface. Accordingly, the response angle of the reed switch varies.

Therefore, a sixth embodiment will be described wherein a magnetic sensing element is reliably operated at a substantially given response angle when the case is tilted and returned to the horizontal position.

Figure 17:
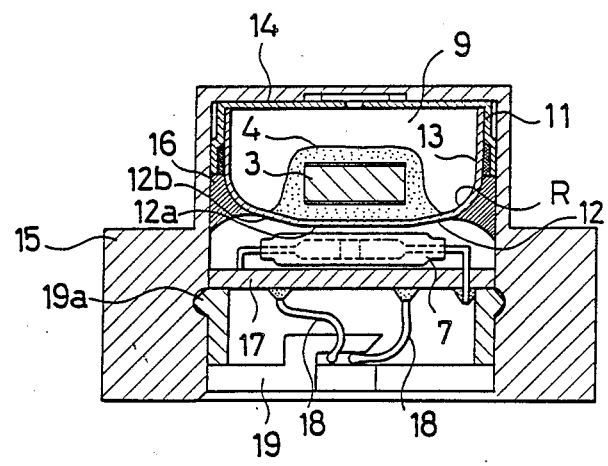
FIG. 17 is a sectional view of a sixth embodiment of the present invention.

In FIG. 17, a nonmagnetic case 11 is constituted by a bottom portion 12 consisting of a first bottom surface 12a located at a central portion of the case, and a second bottom surface 12b continuous with the first bottom surface, a side wall 13 continuous with the bottom portion, and a lid 14, and includes a hollow portion 9. This embodiment can be characterized in that the second bottom surface 12b is continuous with the side wall at a relatively large radius R of curvature.

Figure 18:
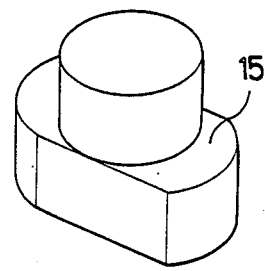
FIG. 18 is an exploded perspective view thereof.
Figure 18:
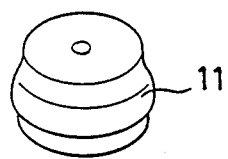
Figure 18:
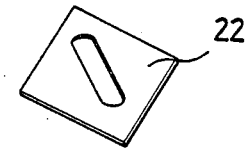
Figure 18:
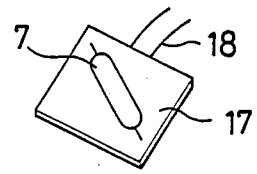
Figure 18:
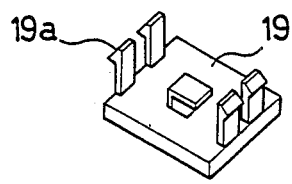

FIG. 18 is an exploded perspective view of FIG. 17. Reference numeral 22 denotes a spacer. Normally, a printed board 17 is stopped by a lower portion of a cylindrical portion of a mounting base 15, and hence the printed board cannot be further inserted therein. As a result, a predetermined gap is formed between the the bottom portion of the case 11 and the upper surface of a reed switch 7. If the predetermined gap cannot be assured due to a mounting state of the case 11, an appropriate number of spacers 20 can be stacked and inserted to assure the gap.

In the embodiment having the above-described arrangement, when the case is tilted at a predetermined angle, the permanent magnet 3 is moved from the first bottom surface 12a to the second bottom surface 12b by its weight, thereby operating the reed switch 7. Furthermore, when the case is returned to the normal state from the tilted state, since a portion R rises at a considerably steep angle, the permanent magnet can be easily moved from the second bottom surface to the first bottom surface. As a result, the permanent magnet is moved at the predetermined angle despite the state wherein a considerably large area of the side wall is wet with the magnetic fluid, thereby operating the reed switch.

The reed switch can be reliably operated at the substantially same response angle when the case is tilted as well as when the case is returned to the horizontal position, in the above-described manner.

Figure 19A:
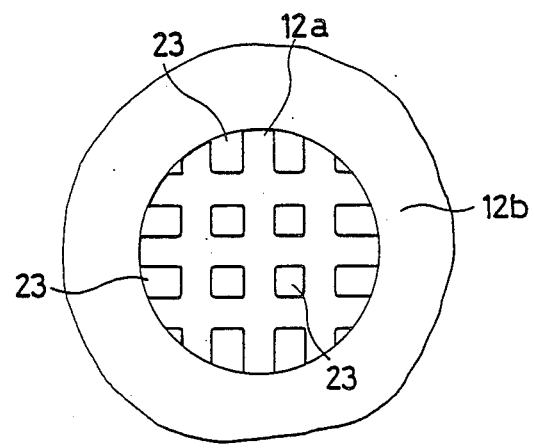
FIGS. 19(a) and 19(b) are views showing an indented bottom surface.
Figure 19B:
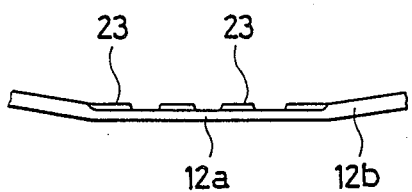

FIGS. 19(a) and 19(b) are views wherein the first bottom surface 12a is indented, and portions 23 extending toward the permanent magnet are formed to be substantially small. This arrangement allows smooth movement of the permanent magnet. In this arrangement, even if the sensor is kept unused for a long period of time, the magnetic fluid can be smoothly moved when detection is performed, thereby improving detection precision.

What is claimed is:

1. A tilt sensor comprising a nonmagnetic case having a hollow portion defined by a bottom portion constituted by a first bottom located at a central portion of said case and a second bottom surface crossing the first bottom surface at a predetermined angle, and a side wall formed continuous with the bottom portion, a permanent magnet having an outer surface, a magnetic fluid coated on said outer surface of said permanent magnet, said permanent magnet being housed in the hollow portion so as to slide on said bottom surfaces, and a magnetic sensing element, disposed and fixed outside the bottom portion of said case, for detecting magnetism of said permanent magnet.

2. A sensor according to claim 1, wherein said magnetic sensing element is mounted such that a distance between said magnetic sensing element and said permanent magnet located in a first bottom surface area can be adjusted.

3. A sensor according to claim 1, wherein said magnetic sensing element includes a nonlinear magnetic sensing element.

4. A sensor according to claim 3, wherein said nonlinear magnetic sensing element comprises a reed switch.

5. A sensor according to claim 4, wherein said reed switch is mounted in a direction perpendicular or substantially perpendicular to the first bottom surface.

6. A sensor according to claim 5, wherein said reed switch is disposed such that one end portion of one reed is located near said permanent magnet located in the first bottom surface area, and one end portion of the other reed is located apart from said permanent magnet, while an auxiliary magnet is disposed near the one end portion of the other reed.

7. A sensor according to claim 4, wherein said reed switch is mounted in a direction parallel or substantially parallel to the first bottom surface.

8. A tilt sensor comprising a nonmagnetic case having a sealed hollow portion defined by a bottom portion, a side wall portion, and a ceiling portion, a permanent magnet having an outer magnet surface, a magnetic fluid coated on said outer surface of said permanent magnet said permanent magnet being housed in the hollow portion, so as to slide on said bottom portion and a magnetic sensing element, arranged outside the bottom of said case, for detecting magnetism of said permanent magnet, wherein a magnetic body is arranged on the ceiling portion of said nonmagnetic case to apply a magnetic field to said permanent magnet.

9. A sensor according to claim 8, wherein said magnetic sensing element comprises a reed switch arranged to be substantially parallel to the bottom portion.

10. A sensor according to claim 8 or 9, wherein a position of said magnetic body arranged on the ceiling portion can be adjusted.

11. A sensor according to claim 8 or 9, wherein said magnetic body comprises a trimmer arranged on a central portion of the ceiling portion.

12. A tilt sensor comprising
a nonmagnetic case having a sealed hollow portion defined by a bottom portion, a peripheral portion of which is tilted at a predetermined angle or moderately arcuated upward, and a side wall portion continuous with the peripheral portion of the bottom portion,
a permanent magnet having an outer surface,
a magnetic fluid coated on said outer surface of said permanent magnet, said permanent magnet being housed in the hollow portion so as to slide on said bottom portion,
a magnetic sensing element, arranged outside the bottom portion of said case, for detecting a magnetism of said permanent magnet and
means for providing displacement of said magnetic sensing element from a position in alignment with the center of the bottom portion in the radial direction.

13. A sensor according to claim 12, wherein said magnetic sensing element comprises a reed switch arranged to be substantially parallel to the bottom portion.

14. A sensor according to claim 13, wherein said magnetic sensing element is mounted on a printed board, and moved together with the printed board.

15. A sensor according to claim 12 or 13, wherein said magnetic sensing element is mounted on a printed board having a plurality of mounting holes, and a position of said magnetic sensing element relative to the bottom portion can be changed by appropriately selecting the mounting holes.

16. A tilt sensor comprising a non magnetic case having a hollow portion constituted by a first bottom portion located at a central portion of said case and a second bottom surface crossing said first bottom surface at a predetermined angle, and a side wall formed continuous with the bottom portion, a permanent magnet having an outer surface, a magnetic fluid coated on said outer surface of said permanent magnet, said permanent magnet being housed in the hollow portion so as to slide on said bottom surfaces and a magnetic sensing element disposed and fixed outside the bottom hollow portion so as to slide on said bottom surfaces and a portion of said case for detecting magnetism of said permanent magnet, wherein said second bottom portion is continuous with the side wall at a peripheral junction, said junction having arcuate configuration with a relatively large radius of curvature.

17. A sensor according to claim 16, wherein said first bottom surface is indented, and an area of portions of said first bottom surface, which extends toward said permanent magnet, is substantially made small.

* * * * *